United States Patent
Zang et al.

(10) Patent No.: US 11,665,020 B2
(45) Date of Patent: May 30, 2023

(54) DETECTING COLLISIONS ON A NETWORK

(71) Applicant: Microchip Technology Incorporated, Chandler, AZ (US)

(72) Inventors: John Junling Zang, Guangdong (CN); Dixon Chen, Guangdong (CN); Yanzi Xu, Guangdong (CN); Henry Liang, Guangdong (CN)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/587,505

(22) Filed: Sep. 30, 2019

(65) Prior Publication Data
US 2021/0058269 A1   Feb. 25, 2021

(30) Foreign Application Priority Data
Aug. 23, 2019 (CN) .......................... 201910784565.6

(51) Int. Cl.
*H04L 12/413* (2006.01)
(52) U.S. Cl.
CPC ................... *H04L 12/413* (2013.01)
(58) Field of Classification Search
CPC ............. H04L 12/40032; H04L 12/413; H04L 12/4135
See application file for complete search history.

(56) References Cited

U.S. PATENT DOCUMENTS

| | | |
|---|---|---|
| 4,739,276 A | 4/1988 | Graube |
| 4,970,466 A | 11/1990 | Bolles et al. |
| 5,134,377 A | 7/1992 | Reddy et al. |
| 5,305,459 A | 4/1994 | Rydel |
| 5,357,145 A | 10/1994 | Segaram |
| 5,381,348 A | 1/1995 | Ernst et al. |
| 5,581,556 A | 12/1996 | Ohie |
| 5,784,573 A | 7/1998 | Szczepanek et al. |
| 5,859,554 A | 1/1999 | Higashisaka et al. |
| 5,892,893 A | 4/1999 | Hanf et al. |
| 6,029,202 A | 2/2000 | Frazier et al. |
| 6,115,831 A | 9/2000 | Hanf et al. |
| 6,185,195 B1 * | 2/2001 | Leung ............... H04N 1/32683 379/406.09 |

(Continued)

FOREIGN PATENT DOCUMENTS

| | | |
|---|---|---|
| CN | 101127928 A | 2/2008 |
| CN | 101616048 A | 12/2009 |

(Continued)

OTHER PUBLICATIONS

Zimmerman et al., "IEEE P802.3cg 10Mb/s Single Pair Ethernet: A guide", Long Beach, CA, USA, Jan. 16, 2019. (Year: 2019).*

(Continued)

*Primary Examiner* — Khoa Huynh
(74) *Attorney, Agent, or Firm* — TraskBritt

(57) ABSTRACT

Various embodiments relate to detecting collisions on a communication network. A method may include transmitting a first signal to a shared bus. The method may also include observing a second signal at the shared bus during the transmitting. Further, the method may include detecting a collision on the shared bus in response to an amplitude of the second signal being one of greater than a first threshold and less than a second threshold.

18 Claims, 8 Drawing Sheets

(56) References Cited

U.S. PATENT DOCUMENTS

| | | | |
|---|---|---|---|
| 6,192,422 B1* | 2/2001 | Daines | H04L 47/29 710/36 |
| 6,215,816 B1 | 4/2001 | Gillespie et al. | |
| 6,459,739 B1 | 10/2002 | Roman | |
| 6,463,543 B1 | 10/2002 | Alvarez | |
| 6,479,983 B1 | 11/2002 | Ebiya | |
| 6,691,241 B1 | 2/2004 | Taylor | |
| 6,735,217 B1 | 5/2004 | Webber, Jr. et al. | |
| 6,920,132 B1 | 7/2005 | Lo | |
| 6,973,094 B1 | 12/2005 | Holloway et al. | |
| 7,110,423 B1 | 9/2006 | Sethuram | |
| 7,319,705 B1 | 1/2008 | Wu et al. | |
| 7,558,348 B1 | 7/2009 | Liu et al. | |
| 7,906,973 B1 | 3/2011 | Orr | |
| 8,243,752 B2 | 8/2012 | Barkan et al. | |
| 8,935,125 B1 | 1/2015 | Fu et al. | |
| 9,454,212 B1 | 9/2016 | Schulze | |
| 9,628,082 B1 | 4/2017 | Smith et al. | |
| 9,696,361 B1 | 7/2017 | Sun et al. | |
| 10,684,977 B1 | 6/2020 | Seger et al. | |
| 10,863,386 B1 | 12/2020 | Anand et al. | |
| 11,218,964 B2 | 1/2022 | Chae et al. | |
| 2002/0162038 A1 | 10/2002 | Bullman et al. | |
| 2003/0061341 A1 | 3/2003 | Loh et al. | |
| 2003/0126486 A1 | 7/2003 | Bui | |
| 2003/0200306 A1 | 10/2003 | Park et al. | |
| 2003/0225802 A1 | 12/2003 | Ruthstein et al. | |
| 2004/0028164 A1 | 2/2004 | Jiang et al. | |
| 2004/0145500 A1 | 7/2004 | Huebl | |
| 2004/0240598 A1 | 12/2004 | Yin | |
| 2004/0251912 A1 | 12/2004 | Pharn et al. | |
| 2005/0063116 A1 | 3/2005 | Rotheroe | |
| 2005/0078683 A1 | 4/2005 | Page | |
| 2005/0128826 A1 | 6/2005 | Kwack et al. | |
| 2006/0109784 A1 | 5/2006 | Weller et al. | |
| 2006/0181283 A1 | 8/2006 | Wajcer et al. | |
| 2006/0209710 A1 | 9/2006 | Watanabe | |
| 2007/0008011 A1 | 1/2007 | Thurston | |
| 2007/0069768 A1* | 3/2007 | Hatooka | H03K 5/19 327/74 |
| 2007/0121624 A1 | 5/2007 | Kimbrough et al. | |
| 2007/0133586 A1* | 6/2007 | Ojard | H04L 12/40032 370/421 |
| 2007/0160087 A1 | 7/2007 | Findlater et al. | |
| 2008/0024178 A1 | 1/2008 | Kim et al. | |
| 2008/0037693 A1 | 2/2008 | Andrus et al. | |
| 2008/0117810 A1 | 5/2008 | Stott et al. | |
| 2008/0159330 A1 | 7/2008 | Deng et al. | |
| 2008/0162682 A1 | 7/2008 | Ramachandran et al. | |
| 2008/0186996 A1 | 8/2008 | Powell et al. | |
| 2009/0003835 A1 | 1/2009 | Arahira | |
| 2009/0201936 A1 | 8/2009 | Dumet et al. | |
| 2010/0202436 A1* | 8/2010 | Albert | H04J 3/0655 370/350 |
| 2011/0022699 A1 | 1/2011 | Powell et al. | |
| 2011/0028104 A1 | 2/2011 | Giombanco et al. | |
| 2011/0170476 A1 | 7/2011 | Shapira et al. | |
| 2012/0087662 A1 | 4/2012 | Suzuki et al. | |
| 2012/0155476 A1 | 6/2012 | Pavani et al. | |
| 2012/0229214 A1 | 9/2012 | Kasanyal | |
| 2012/0307821 A1 | 12/2012 | Diab | |
| 2013/0007480 A1 | 1/2013 | Wertheimer et al. | |
| 2013/0021063 A1 | 1/2013 | Kwon | |
| 2013/0101058 A1 | 4/2013 | Hummel | |
| 2013/0159489 A1 | 6/2013 | Cha et al. | |
| 2013/0162300 A1 | 6/2013 | Liu et al. | |
| 2013/0229926 A1 | 9/2013 | Lu et al. | |
| 2013/0329773 A1 | 12/2013 | Cheng et al. | |
| 2014/0073352 A1* | 3/2014 | Aldana | G01S 5/10 455/456.1 |
| 2014/0177653 A1 | 6/2014 | Tzeng | |
| 2014/0268141 A1 | 9/2014 | Pariseau | |
| 2014/0281626 A1 | 9/2014 | Younger et al. | |
| 2015/0063375 A1 | 3/2015 | Tzeng et al. | |
| 2015/0124797 A1 | 5/2015 | Babitch et al. | |
| 2015/0131708 A1 | 5/2015 | Cornett et al. | |
| 2015/0145563 A1 | 5/2015 | Pardoen | |
| 2015/0145581 A1 | 5/2015 | Palmer et al. | |
| 2015/0205339 A1 | 7/2015 | Park et al. | |
| 2015/0237178 A1 | 8/2015 | Zhang | |
| 2015/0370312 A1 | 12/2015 | Desposito et al. | |
| 2016/0094362 A1 | 3/2016 | Brennan | |
| 2016/0323287 A1 | 11/2016 | Kishikawa et al. | |
| 2016/0337138 A1 | 11/2016 | Gardner et al. | |
| 2017/0046298 A1 | 2/2017 | Yu et al. | |
| 2017/0111069 A1* | 4/2017 | Dafesh | H04B 1/1036 |
| 2018/0034658 A1 | 2/2018 | Kinage et al. | |
| 2018/0165056 A1 | 6/2018 | Lay et al. | |
| 2018/0181525 A1 | 6/2018 | Iyer et al. | |
| 2018/0262526 A1 | 9/2018 | Wang et al. | |
| 2018/0314285 A1 | 11/2018 | Susanto et al. | |
| 2019/0179398 A1 | 6/2019 | Arora et al. | |
| 2019/0199537 A1 | 6/2019 | Seo et al. | |
| 2019/0230705 A1 | 7/2019 | Beruto et al. | |
| 2019/0261420 A1 | 8/2019 | Axer et al. | |
| 2019/0268941 A1 | 8/2019 | Axer et al. | |
| 2019/0313446 A1 | 10/2019 | Kim et al. | |
| 2019/0357146 A1 | 11/2019 | Kim et al. | |
| 2019/0361711 A1 | 11/2019 | Kim et al. | |
| 2019/0363991 A1 | 11/2019 | Sostawa et al. | |
| 2019/0385057 A1 | 12/2019 | Litichever et al. | |
| 2020/0136993 A1 | 4/2020 | Yun et al. | |
| 2020/0153174 A1 | 5/2020 | Curtis et al. | |
| 2020/0295957 A1 | 9/2020 | Kim et al. | |
| 2020/0343993 A1 | 10/2020 | Rentschler et al. | |
| 2020/0351943 A1 | 11/2020 | Iyer et al. | |
| 2020/0367096 A1* | 11/2020 | Hwang | H04W 4/40 |
| 2020/0371579 A1 | 11/2020 | Selvam et al. | |
| 2021/0282087 A1 | 9/2021 | Den Besten | |
| 2021/0303050 A1 | 9/2021 | Ching et al. | |
| 2022/0046114 A1 | 2/2022 | Entelis et al. | |

FOREIGN PATENT DOCUMENTS

| | | |
|---|---|---|
| CN | 1866803 B | 5/2012 |
| CN | 102813530 A | 12/2012 |
| CN | 204392278 U | 6/2015 |
| CN | 106031098 A | 10/2016 |
| CN | 107836131 A | 3/2018 |
| DE | 102018105007 A1 | 9/2019 |
| EP | 0620664 | 10/1994 |
| EP | 1388975 A1 | 2/2004 |
| EP | 1940086 A1 | 7/2008 |
| EP | 3094044 A1 | 11/2016 |
| EP | 3573287 A1 | 11/2019 |
| EP | 3618364 A1 | 3/2020 |

OTHER PUBLICATIONS

International Search Report from International Application No. PCT/US2020/070345, dated Nov. 12, 2020, 5 pages.

International Written Opinion from International Application No. PCT/US2020/070345, dated Nov. 12, 2020, 8 pages.

LAN/MAN Standards Committee of the IEEE Computer Society, "Draft Standard for Ethernet Amendment: Physical Layer Specifications and Management Parameters for 10 Mb/s Operation and Associated Power Delivery over a Single Balanced Pair of Conductors," IEEE Draft, P802.3cg/D2.4, Feb. 21, 2019, The Institute of Electrical and Electronics Engineers, Inc., pp. 1-60, New York.

Meier, "Analysis of Worst Case Latencies in an 10 Mbit Ethernet network with PLCA", IEEE Draft, V4, Jan. 17, 2018, pp. 1-11.

Pannell et al., "Quality of Service for PLCA", NXP, May 2018 (May 24, 2018), pp. 1-37, vol. 802.1, No. v02 24, Pittsburg.

U.S. Appl. No. 16/587,583, filed Sep. 30, 2019, titled "Interface for Improved Media Access, and Related Systems, Methods, and Devices", to Chen et al., 51 pages.

U.S. Appl. No. 16/588,562, filed Sep. 30, 2019, titled "Transceiver and Driver Architecture with Low Emission and High Interference Tolerance", to An et al., 36 pages.

U.S. Appl. No. 16/588,714, filed Sep. 30, 2019, titled "Diagnosing Cable Faults Within a Network", to Zang et al., 40 pages.

(56) References Cited

OTHER PUBLICATIONS

U.S. Appl. No. 16/591,294, filed Oct. 2, 2019, titled "Wake Detection at Controller for Physical Layer of Single Pair Ethernet Network, and Related Systems, Methods and Devices", to An et al., 31 pages.
U.S. Appl. No. 16/653,688, filed Oct. 15, 2019, titled "Physical Layer to Link Layer Interface and Related Systems, Methods and Devices", to Iyer et al., 32 pages.
U.S. Appl. No. 16/684,419, filed Nov. 14, 2019, titled "Ethernet Interface and Related Systems Methods and Devices", to Iyer et al., 23 pages.
U.S. Appl. No. 16/684,428, filed Nov. 14, 2019, titled "Ethernet Interface and Related Systems Methods and Devices", to Iyer et al., 30 pages.
U.S. Appl. No. 62/881,720, filed Aug. 1, 2019, titled "Single Pair Ethernet Physical Layer Architecture and Systems, Devices, and Methods for Implementing the Same", to Iyer et al., 35 pages.
U.S. Appl. No. 62/993,825, filed Mar. 24, 2020, titled "Low Pin Count Handshake Signaling Protocol According to 10BASE-T1X Local and Remote Wake Detect and Related Systems, Methods, and Devices", to Iyer et al., 13 pages.
Fitzgerald: "10BASE-T1L Low Power Idle (802.3cg D2.0)", IEEE-SA, Acuitas Silicon, (Aug. 15, 2018) 9 pages.
Microchip KSZ8061MNX/MNG, "100BASE-T/100BASE-TX Physical Layer Transceiver" Device Document 00002038D (Aug. 15, 2018) 66 pages.
Microsoft. "P." Microsoft Computer Dictionary, 5th ed., Penguin Books, 2002. (Year: 2002).

\* cited by examiner

DETECTING COLLISIONS ON A NETWORK

PRIORITY CLAIM

This application claims the benefit of the filing date of Chinese Patent Application Serial No. 201910784565.6, filed Aug. 23, 2019, the disclosure of which is hereby incorporated herein in its entirety by this reference.

TECHNICAL FIELD

The present disclosure relates generally to communication networks, and more specifically, to detecting collisions on a single pair Ethernet network.

BACKGROUND

Various interface standards for connecting computers and external peripherals may be used to provide connectivity at high speeds. A widely used, flexible networking standard for connecting computers (e.g., in Local Area Networks (LANs) and Wide Area Networks (WANs)) is the Ethernet protocol. Ethernet communication generally refers to point-to-point communication within a network of multiple end points. Ethernet generally makes efficient use of shared resources, is easy to maintain and reconfigure, and is compatible across many systems.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
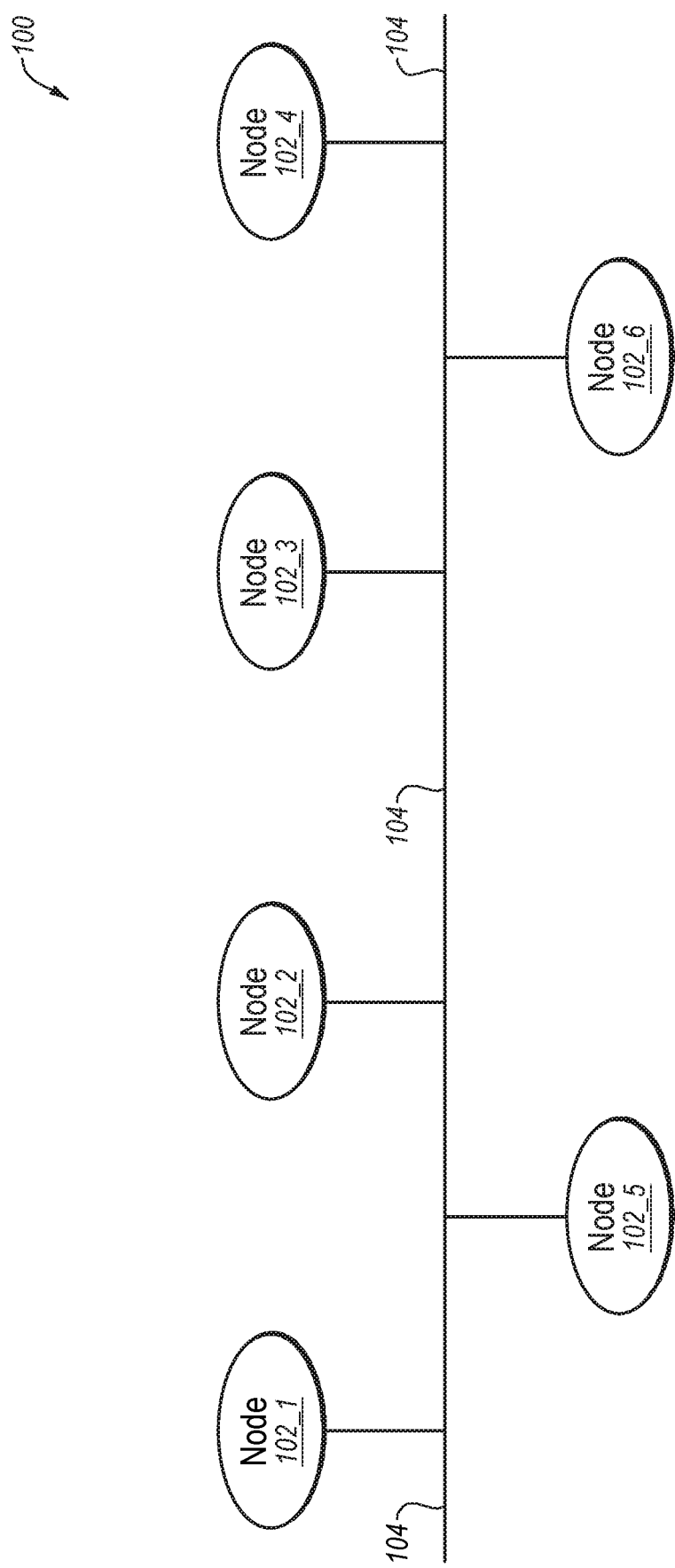
FIG. 1 depicts a network including a number of nodes, in accordance with various embodiments of the disclosure.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

A vehicle, such as an automobile, a truck, a bus, a ship, and/or an aircraft, may include a vehicle communication network. The complexity of a vehicle communication network may vary depending on a number of electronic devices within the network. For example, an advanced vehicle communication network may include various control modules for, for example, engine control, transmission control, safety control (e.g., antilock braking), and emissions control. To support these modules, the automotive industry relies on various communication protocols.

10SPE (i.e., 10 Mbps Single Pair Ethernet) is network technology specification currently under development by the Institute of Electrical and Electronics Engineers as specification IEEE 802.3cg™. A 10SPE network may include a number of nodes (also referred to herein as "endpoints"), wherein at least some of the nodes may include a OSPE physical layer (PHY).

A 10SPE PHY may operate in a half-duplex mode and may support carrier-sense multiple access with collision detection (CSMA/CD), which is a media access control method used most notably in early Ethernet technology for local area networking. According to CSMA/CD, a node that wishes to transmit via a bus should defer transmission if there is already a carrier on the bus. In other words, if a node senses a carrier on the bus, the node should wait to transmit. The inventors of this disclosure appreciate that the above assumes non-simultaneous transmission by nodes of the network, that is, assumes that there will be a sufficient gap in time between when nodes begin to transmit for a later in time node to detect the carrier for an earlier in time node's data packet. However, the inventors of this disclosure appreciate that sometimes two or more nodes may begin to transmit so close in time that the nodes will not detect an active carrier before beginning to transmit.

Various embodiments, as described more fully below, relate to detecting collisions on a shared bus (e.g., a 10SPE bus), and more specifically, detecting collisions at a physical layer (i.e., a PHY) of a 10SPE network. In some embodiments, a PHY, while transmitting, may be configured to observe signal levels at a 10SPE bus and to detect a collision on the bus based, at least in part, on the observed signal levels. Stated another way, a PHY, while transmitting, may determine whether at least one other node in a network is also transmitting.

According to various embodiments, detection of an unusual signal amplitude (e.g., at a 10SPE PHY) may be indicative of a collision on a 10SPE network. More specifically, in some embodiments, a network collision may be detected when an amplitude of a signal observed on the bus by transmitting PHY is either larger or smaller than an expected amplitude. For example, a PHY, which is transmitting a first signal (a "locally transmitted signal"), may observe a second signal that may include the first signal and another signal ("remotely transmitted signal") transmitted by another PHY. In this example, if the locally transmitted signal has the same phase as the remotely transmitted signal, then, in theory, the signals will constructively interfere and the signal observed at the PHY should have an amplitude that is greater than an expected amplitude. If the locally transmitted signal has a different phase as the remotely transmitted signal, then, in theory, the signals will destructively interfere with each other and the signal observed at the PHY should have an amplitude that is less than an expected amplitude.

In some embodiments, a 10SPE PHY may include a signal detector, which may include, for example, an amplitude detector (e.g., an analog amplitude detector) and optional logic. The signal detector may be operably coupled to a bus and configured to respond to a signal at the bus that has an amplitude characteristic of a collision. In some embodiments, the signal detector, which may be used to detect collisions while a PHY is operating in a transmit mode, may also be used to detect signals while a PHY is operating in a receive mode.

In some embodiments, a signal detector of a PHY may be configured to use one or more threshold values. In these embodiments, to detect signals having an amplitude that is greater than expected, the signal detector may be configured to use a first "greater" threshold value. For example, the signal detector may be programmed with the first threshold (e.g., a first differential threshold) during a first phase (e.g., for a first number of bits of a collision detection operation). Further, to detect signals having an amplitude that is less than expected, the signal detector may be configured to use a second, lower threshold value (e.g., a second differential threshold). For example, in some embodiments, the lower threshold value may the same threshold value used for signal detection (e.g., during a receive mode). For example, the signal detector may be programmed with the second threshold value during a second phase (e.g., for a second number of bits of a collision detection operation).

In some embodiments, an output of a signal detector may be multi-sampled (e.g., oversampled) to, for example, enhance reliability with high time domain resolution. For example, the output of a signal detector may be sampled every 10 nanoseconds.

In some embodiments, a collision detection operation may be performed for a specified amount of time (e.g., beginning when signal transmission begins). More specifically, for example, a collision detection operation performed at a PHY may be initiated in response to the PHY transmitting a signal, and the collision detection operation may be performed for a specified bit time (e.g., a programmable bit time of N bits (e.g., 512 bits)) subsequent to initiating transmission. A specified amount of time may be, as non-limiting examples, in terms of time (e.g., microseconds, without limitation), bits/bytes, symbols, or clock cycles, without limitation. As non-limiting examples, an amount of time may be specified in combinational logic or control bit values stored at a control register.

In some embodiments, a collision detection operation may be performed during data transmission (e.g., when transmit is enabled). In other embodiments, a collision detection operation may be limited to a specific amount of time may help to avoid collisions with future incoming signals. According to various embodiments, after expiration of a programmable bit time (e.g., 512 bits), the collision detection operation may be terminated (e.g., via failing to process and/or utilize a signal (e.g., an output of the signal detector)) generated via the detection circuitry.

Various embodiments of the present disclosure are now explained with reference to the accompanying drawings.

FIG. 1 is a block diagram of at least a portion of a network (e.g., a wired local area network) 100, according to some embodiments. More specifically, network 100 may include a 10SPE network. Network 100 includes a number of nodes (also referred to as "endpoints") operably coupled to a communication bus 104. More specifically, network 100 includes nodes 102_1, 102_2, 102_3, 102_4, 102_5, and 102_6, generally nodes 102. Although network 100 is depicted as having six nodes, the disclosure is not so limited, and a network may include more than six nodes (e.g., eight nodes, ten nodes, twelve nodes, or more) or less than six nodes (e.g., five nodes, three nodes, or two nodes).

Each node 102_1, 102_2, 102_3, 102_4, 102_5, and 102_6 is configured to communicate via communication bus 104, which may include or be a shared bus (e.g., a single twisted pair). As used herein, the term "shared bus" refers to a wired transmission medium, such as a single twisted pair, that conducts both transmit signals and receive signals over the same conductive structure (e.g., one or more cables).

In at least some embodiments, network 100 may be used in an automotive environment. More specifically, by way of non-limiting example, network 100 may be configured to connect one or more of nodes 102 to other nodes, a computer, and/or controller (e.g., within a vehicle). In this example, each node 102 of network 100 may include, for example, an amplifier, a microphone, an antenna, a speaker, and/or a sensor, without limitation. Other non-limiting examples of application environments include lighting systems, residential and commercial building networks, and elevator networks.

Figure 2:
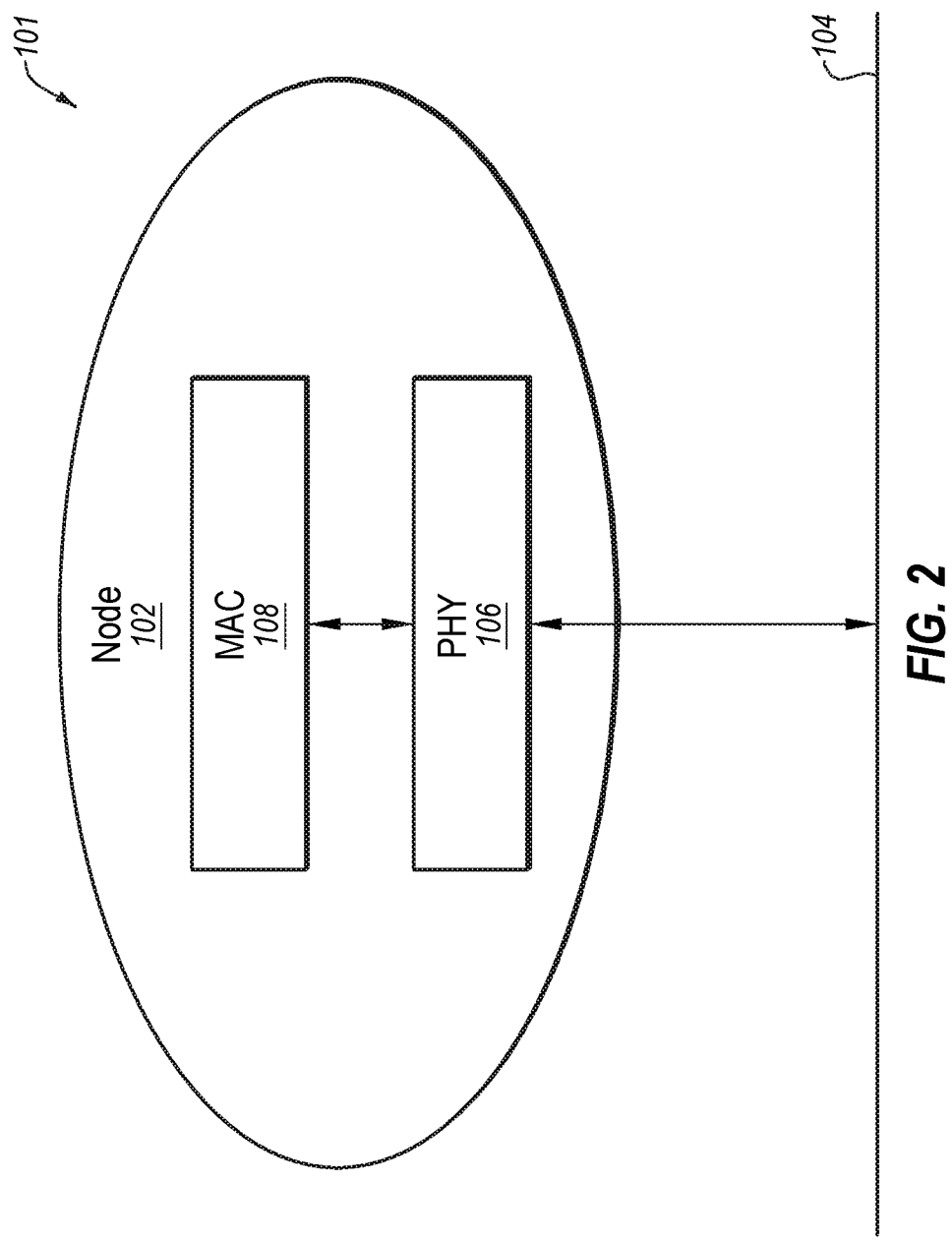
FIG. 2 illustrates a node, including a media access layer and a physical layer, coupled to a network, according to various embodiments of the disclosure.

FIG. 2 depicts an example network segment 101 including a node 102 (e.g., node 102_1, node 102_2, node 102_3, node 102_4, node 102_5, or node 102_6) coupled to communication bus 104. As shown in FIG. 2, node 102 includes a physical layer (PHY) 106 operably coupled to a media access control (MAC) layer 108. PHY 106 may be configured to serve as an interface for a physical connection between MAC 108 and communication bus 104. In some embodiments, PHY 106 includes at least a portion of Ethernet physical layer circuitry. As described more fully below, a PHY (e.g., PHY 106) may include a transceiver having transmit circuitry and receive circuitry.

Figure 3A:
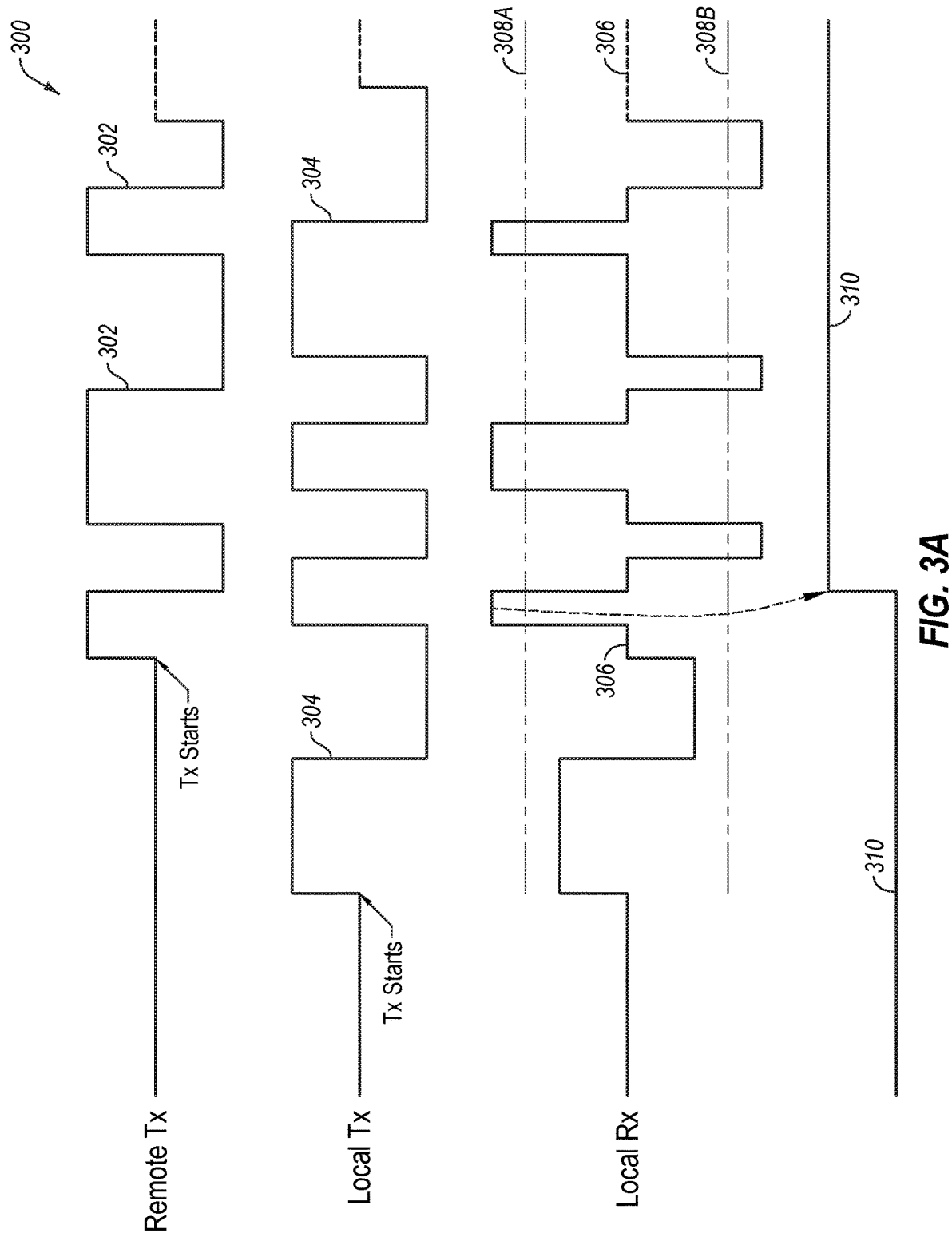
FIGS. 3A and 3B depict timing diagrams showing various signals associated with a network, in accordance with various embodiments of the disclosure.
Figure 3B:
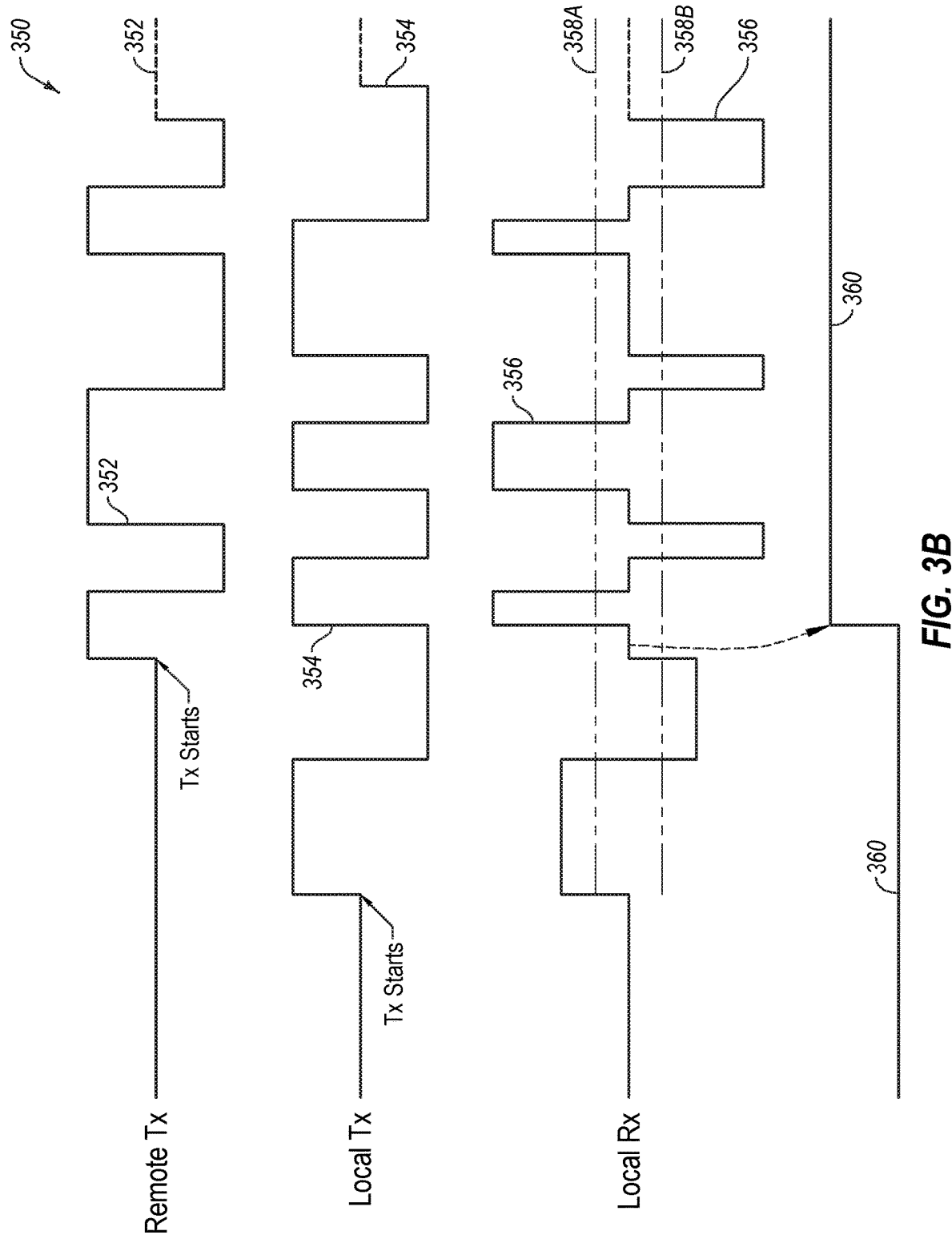

FIGS. 3A and 3B depict timing diagrams showing various signals associated with a network (e.g., network 100 of FIG. 1), according to various embodiments of the disclosure. More specifically, FIG. 3A depicts a timing diagram 300 showing signals associated with detecting a collision based on a signal observed at a PHY, where the observed signal has an amplitude that is greater than expected. More specifically, timing diagram 300 includes a signal 302 indicative of signal transmitted by a first node (e.g., of node 102_1), and a signal 304 indicative of signal transmitted by a second node (e.g., of node 102_2). Timing diagram 300 further includes a signal 306 indicative of signal observed by a PHY of the second node (e.g., of node 102_2). Also, timing diagram 300 further depicts threshold values 308A and 308B (i.e., for detecting a signal having an amplitude whose absolute value is greater than expected), and a signal 310, generated at a signal detector at the PHY, which may be indicative of a collision.

As shown in timing diagram 300, if the first node and the second node are transmitting simultaneously, an amplitude of signal 306, which represents a signal observed at the PHY of the second node (e.g., of node 102_2), exceeds at least one of thresholds 308A and 308B, and in response signal 310 transitions from a low state to a high state to indicate a collision. In this example, because the absolute value of the amplitude of signal 306 exceeds both thresholds 308A and 308B, the amplitude of signal 306 is greater than expected (i.e., compared to if only the second node was transmitting). Because the amplitude of signal 306 is greater than thresholds 308 and/or 308B, it may be inferred that at least two nodes (here the first node 102_1 and the second node 102_2) are transmitting simultaneously (in this example, in phase). Notably, in the example shown in FIG. 3A, for a period time prior to when the amplitude of signal 306 exceeded threshold 308A, signal 310 is de-asserted because the absolute value of the amplitude of signal 306 did not exceed either of the thresholds.

FIG. 3B depicts a timing diagram 350 showing signals associated with detecting a collision based on a signal observed at a PHY having an amplitude that is less than expected. More specifically, timing diagram 350 includes a signal 352 indicative of a signal transmitted by the first PHY (e.g., of node 102_1), and a signal 354 indicative of a signal transmitted by the second PHY (e.g., of node 102_2). Timing diagram 350 further includes a signal 356 indicative of a signal observed by the PHY of the second node (e.g., of node 102_2). Also, timing diagram 350 further depicts thresholds 358A and 358B (i.e., for detecting a signal having an amplitude that is less than expected), and a collision signal 360, which may be indicative of a collision.

As shown in timing diagram 350, if the first node and the second node are transmitting simultaneously, the absolute value of an amplitude of signal 356, which represents a signal observed at the PHY of node 102_2, does not exceed thresholds 358A and 358B, and thus signal 360 transitions from a low state to a high state to indicate a collision. In this example, because the absolute value of the amplitude of signal 356 does not exceed thresholds 358A and 358B, the amplitude of signal 356 is less than expected (i.e., compared to if only the PHY of the second node was transmitting). Because the amplitude of signal 306 is less than expected, it may be determined that the first PHY and the second PHY are transmitting simultaneously (here, out of phase).

As noted above, in some embodiments, a collision detection operation may be performed during a specified amount of time during signal transmission (e.g., to avoid later collision that may cause packet loss). More specifically, for example, collision detection may be applied only within a specified bit time (e.g., first 512 bits) (e.g., started in response to signal transmission). In at least some of these embodiments, the remaining duration of signal transmission (e.g., after the 512 bit time) may be used for other signal detection, as a non-limiting example, other signal detection may include carrier signal detection.

Figure 4:
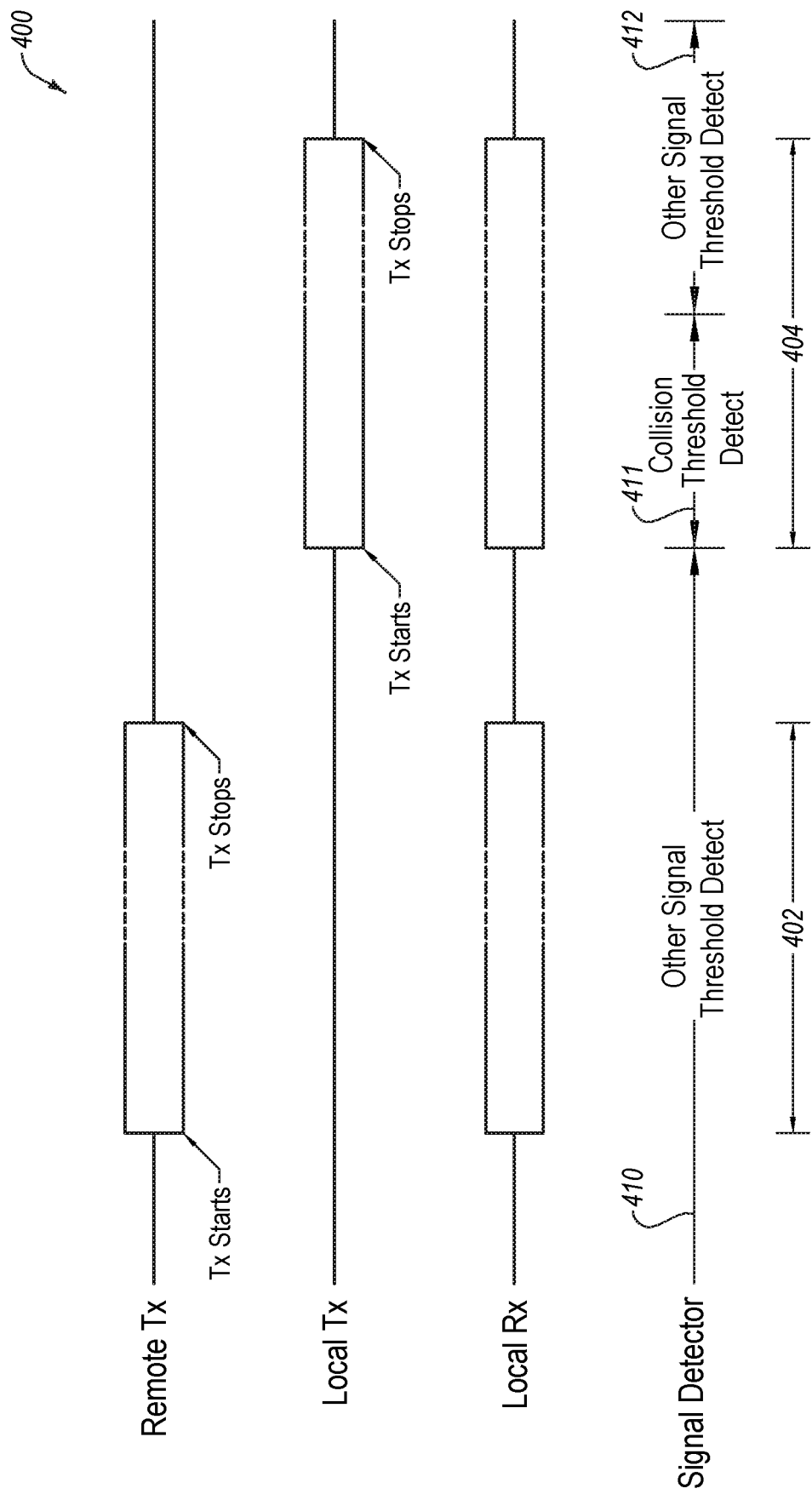
FIG. 4 shows another timing diagram illustrating various signals associated with a network, in accordance with various embodiments of the disclosure.

FIG. 4 depicts a timing diagram 400 including a time period 402 wherein a PHY of a first node (e.g., of node 102_1 of FIG. 1) transmits ("Remote Tx"), and a time period 404 wherein a PHY of a second node (e.g., of node 102_1 of FIG. 1) transmits ("Local Tx"). Further, the PHY of the second node (e.g., node of 102_1 of FIG. 1) receives the transmitted signal ("Local Rx") during each of time period 402 and time period 404. Timing diagram 400 further depicts time periods 411 and 412, wherein other signal threshold detection is performed at the PHY of the second node.

Timing diagram 400 further depicts a time period 411, wherein a collision threshold detect is performed at the PHY of the second node. In this example, time period 411, which starts in response to signal transmission by the PHY of the second node, has a programmable duration. As a non-limiting example, time period 411 may have a bit time duration of approximately 512 bits. As noted above, in some embodiments, a signal detector of a PHY may be used for collision threshold detect (e.g., during a transmit mode), and thus in these embodiments, other signal detect may not be performed during time period 411. In other embodiments, it is specifically contemplated that a PHY may include circuitry (e.g., two signal detectors) configured to simultaneously perform other signal threshold detect and collision threshold detect.

Figure 5:
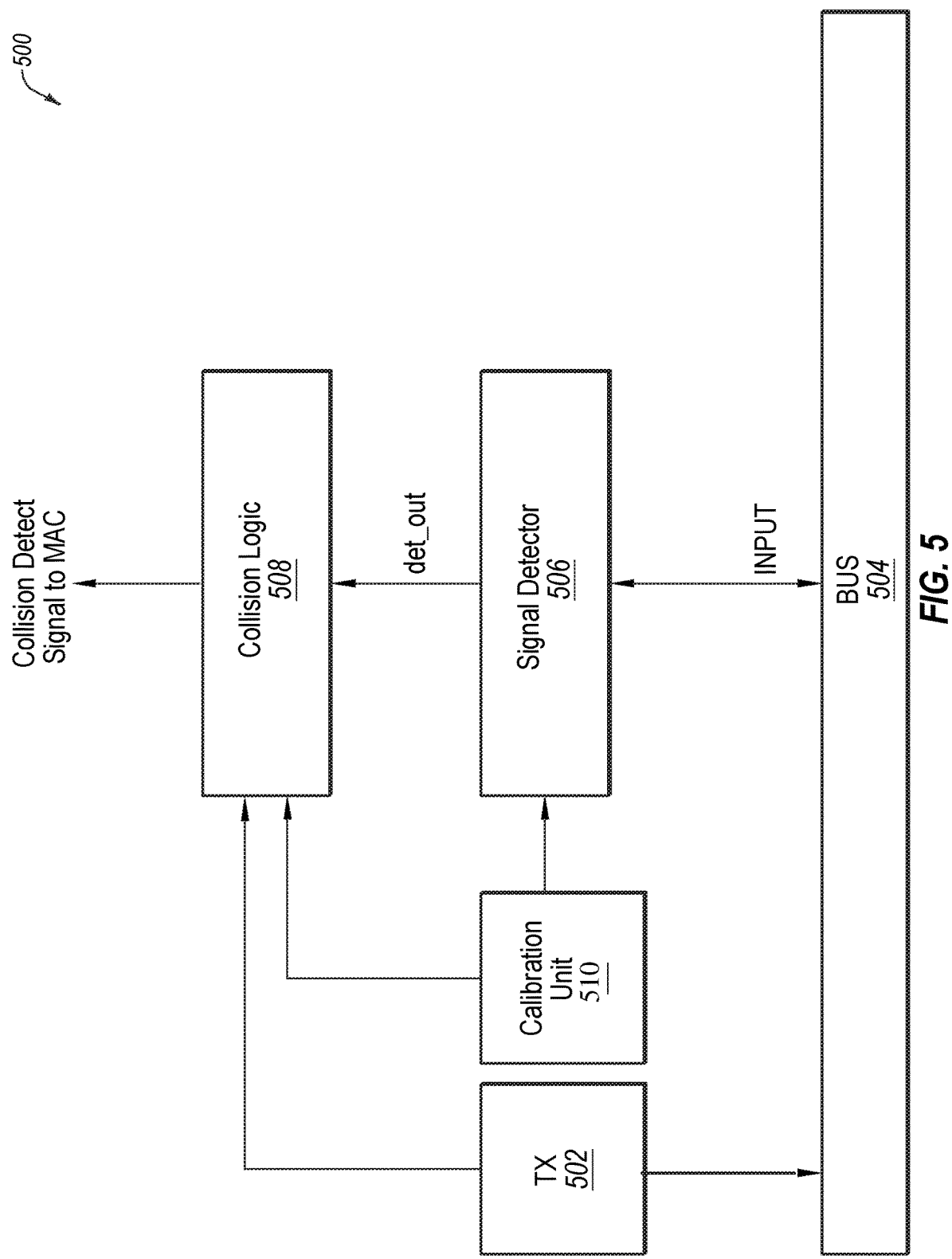
FIG. 5 illustrates an example physical layer of a node of a network, according to various embodiments of the disclosure.

FIG. 5 illustrates an example PHY 500, in accordance to various embodiments of the disclosure. PHY 500 is provided as an example PHY configuration that may be used for carrying out various embodiments disclosed herein; however, the disclosure is not limited to any specific PHY configuration, and other configurations may be within the scope of the disclosure.

For example, PHY 106 of FIG. 2 may include PHY 500. PHY 500 includes transmit circuitry 502, which may be configured for communicating transmit data to communication bus 504 from a MAC (e.g., MAC 108 of FIG. 2). For example, bus 504 may a part of communication bus 104 of FIG. 1 and FIG. 2. Communication bus 504, which may be used for both transmitting and receiving data, may include a single twisted pair (e.g., an Unshielded Twisted Pair, or UTP).

PHY 500 further includes a signal detector 506 and collision logic 508. As described more fully herein, signal detector 506 may be configured to perform signal threshold detection during a time period associated with a collision threshold detect (e.g., time period 411 of FIG. 4), and collision logic 508 may be configured to detect a collision in response to one or more signal thresholds detected by signal detector 506.

PHY 500 may further include a calibration unit 510 for tuning signal detector 506, as a non-limiting example, by tuning one or more threshold values (for example, threshold values stored at signal detector 506) and/or for tuning collision logic 508 with one or more parameters (e.g., a programmable bit time for collision detection).

In one or more embodiments, signal detector 506 may be configured to detect signals observed at communication bus 504 that are outside specified thresholds. More specifically, a signal INPUT (e.g., a differential signal RXP, RXN shown in FIG. 6) of bus 504 may be observed (e.g., observed at p and n terminals operably coupled to a single twisted pair type cable) at signal detector 506. Signal detector 506 may be configured to detect if an amplitude of INPUT is outside a threshold, and in response convey to collision logic 508 a logic "1" for signal det_out, and detect if an amplitude of INPUT is inside a threshold, and in response convey to collision logic 508 a logic "0" for signal det_out. In response to receiving a logic "1" for det_out, collision logic 508 may be configured to transmit a collision detection signal (e.g., signal 310 of FIG. 3A or signal 360 of FIG. 3B), which may be received at a MAC (e.g., MAC 108 of FIG. 2).

As will be appreciated, a 10SPE PHY may operate in a half-duplex mode, and thus, in conventional devices, systems, and/or networks, at least some circuitry of the 10SPE PHY (e.g., signal detector 506) may not be used during a transmit mode. In contrast, according to various embodiments, signal detector 506, which may be used to detect other signal thresholds (e.g., carrier signal thresholds for carrier sense) including during modes other than transmit (e.g., during a receive mode), may be used to detect collisions (e.g., during "collision detection" (also referred to herein as a "collision detection operation")) during a transmit mode (i.e., while a signal is being transmitted by circuitry 502).

As noted herein, according to some embodiments, collision detection may be performed during a specified amount of time (e.g., a programmable bit time) during signal transmission. Accordingly, in at least some of these embodiments, a bit count (i.e., a number of bits transmitted by circuitry 502) may be monitored and provided (e.g., via transmit circuitry 502) to collision logic 508. Upon a bit count being equal to a specified bit number (e.g., 512), a collision detection operation may be terminated. More specifically, in response to signal transmission by a PHY (i.e., the start of signal transmission, responsive to the asserted transmit enable TxEn signal from MAC 108), a collision detection operation may be initiated at the PHY, and bits transmitted by transmit circuitry 502 may be monitored and counted by collision logic 508 in a bit count that represents the number of bits transmitted while collision logic 508 is counting. Upon the bit count being equal to a specified bit number (e.g., 512), a collision detection operation may be terminated (e.g., via failing to process and/or utilize a signal (e.g., signal det_out) within signal detector 506).

It is noted that in some embodiments, at least some portions of transmit circuitry 502 (e.g., a pulse shaper and/or a driver) and/or at least some portions of a receiver (e.g., a signal detector) may be in a chip separate from a chip including signal detector 506 and collision logic 508.

Figure 6:
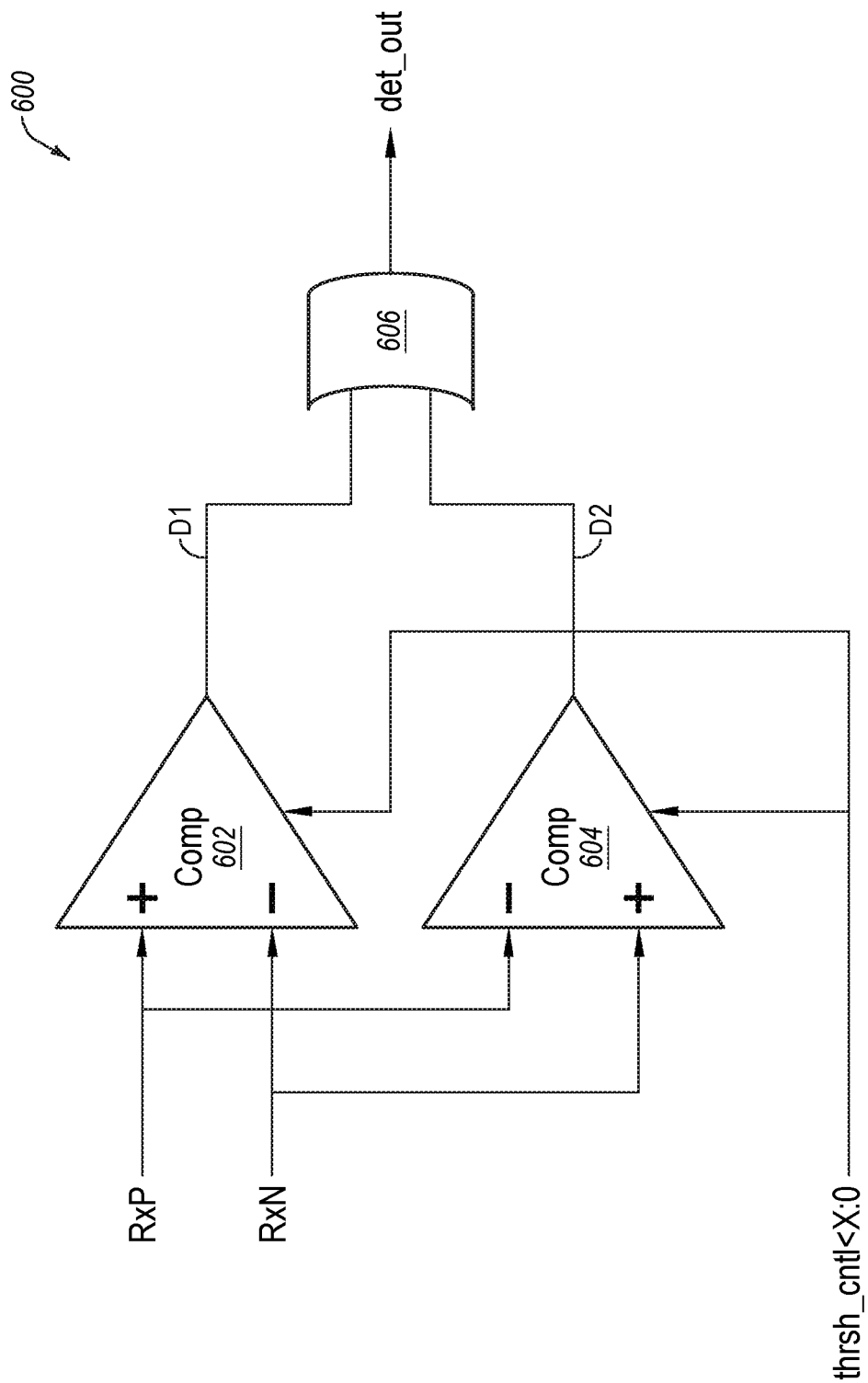
FIG. 6 illustrates an example signal detector, according to various embodiments of the disclosure.

FIG. 6 illustrates an example signal detector 600, according to various embodiments of the disclosure. For example, signal detector 506 of FIG. 5 may include signal detector 600. As illustrated, signal detector 600 includes a comparator 602, a comparator 604 and an OR gate 606. Each comparator 602 and 604 may be tuned via a threshold control signal thrsh_cntl <X:0>, which may be generated via, for example, calibration unit 510 of FIG. 5. Operation of a signal detector, such as signal detector 600, will be known to a person having ordinary skill in art, and thus some details regarding the operation of signal detector 600 will not be described.

During a contemplated operation of signal detector 600, comparator 602 may detect if a positive differential signal RXP has reached a first threshold value or not. If so, an output D1 of comparator 602 is a "1." Similarly, comparator 604 may be used to detect if a negative differential signal RXN has reached the first threshold value (e.g., a negative of the positive threshold value) or not. If so, an output D2 of comparator 604 is a "1." If either comparator 602 or comparator 604 convey a "1," OR gate 606 will convey a "1." Notably, since a differential signal continuously toggles between its positive amplitude and negative amplitude, the outputs of comparators 602 and 604 (i.e., outputs D1 and D2, respectively) may not necessarily be a consecutive "1," however, the output of OR gate 606 may be a consecutive "1." The result of OR gate 606 is thus a consecutive "1," or high potential signal, only when the absolute value of the observed signal is greater than the first threshold value.

As noted above, collision threshold detection may be based on different threshold values. More specifically, in one example, comparators 602 and 604 may programmed with a first threshold value for detecting amplitudes that are greater than expected amplitudes. In this example, if detector output signal det_out includes a high potential signal, i.e., a "1," it may be determined that a received signal (e.g., differential signal RXP, RXN) has an amplitude that is equal to or greater than the first threshold value (e.g., a thus a collision has occurred). Otherwise, it may be determined that the received signal (e.g., differential signal RXP, RXN) has an amplitude that is less than the first threshold value. In other embodiments, if detector output signal det_out includes a high potential signal longer than a predetermined time (e.g., a few nanoseconds) (i.e., differential signal RXP, RXN stays above (i.e., greater than) the first differential threshold value for the predetermined time), it may be determined that a collision has occurred. Otherwise, it may be determined that a collision has not occurred.

Further, in another example, comparators 602 and 604 may programmed with a second, lower threshold value for detecting amplitudes that are less than expected amplitudes. In this example, if detector output signal det_out includes a low potential signal, it may be determined that a received signal (e.g., differential signal RXP, RXN) has an amplitude that is less than the second threshold value (e.g., a thus a collision has occurred). Otherwise, it may be determined that the received signal (e.g., differential signal RXP, RXN) has an amplitude that is equal to or greater than the second threshold value. Stated another way, in some embodiments, collision threshold detection may be characterized as detecting excursions outside a ranged defined by the first threshold and the second threshold. The result of OR gate 606 is thus a consecutive "0," or low potential signal, only when the absolute value of the observed signal is less than the second threshold value.

In other embodiments, if detector output signal det_out includes a low potential signal longer than a programmed time (e.g., a few nanoseconds) (i.e., differential signal RXP, RXN stays within (i.e., less than) the second differential threshold value for the predetermined time), it may be determined (e.g., by collision logic 508) that a collision has occurred. Otherwise, it may be determined that a collision has not occurred.

Signal detector 600 is provided as an example signal detector, and embodiments disclosed herein are not limited to a specific signal detector. Rather, any suitable signal detector may be used for carrying out various embodiments of the disclosure, including, without limitation, using multiple signal detectors.

According to some embodiments, the collision detect signal (e.g., generated via collision logic 508 of FIG. 5) may be used for controlling operation of an associated node. More specifically, for example, the collision detect signal may be conveyed to a MAC (e.g., MAC 108 of FIG. 2), and if a collision detect signal is indicative that a collision has occurred, the MAC may cause the node to stop transmitting. More specifically, in response to detecting a collision, the MAC may cease any further transmission, or cease any further transmission for at least a predetermined back off time.

Figure 7:
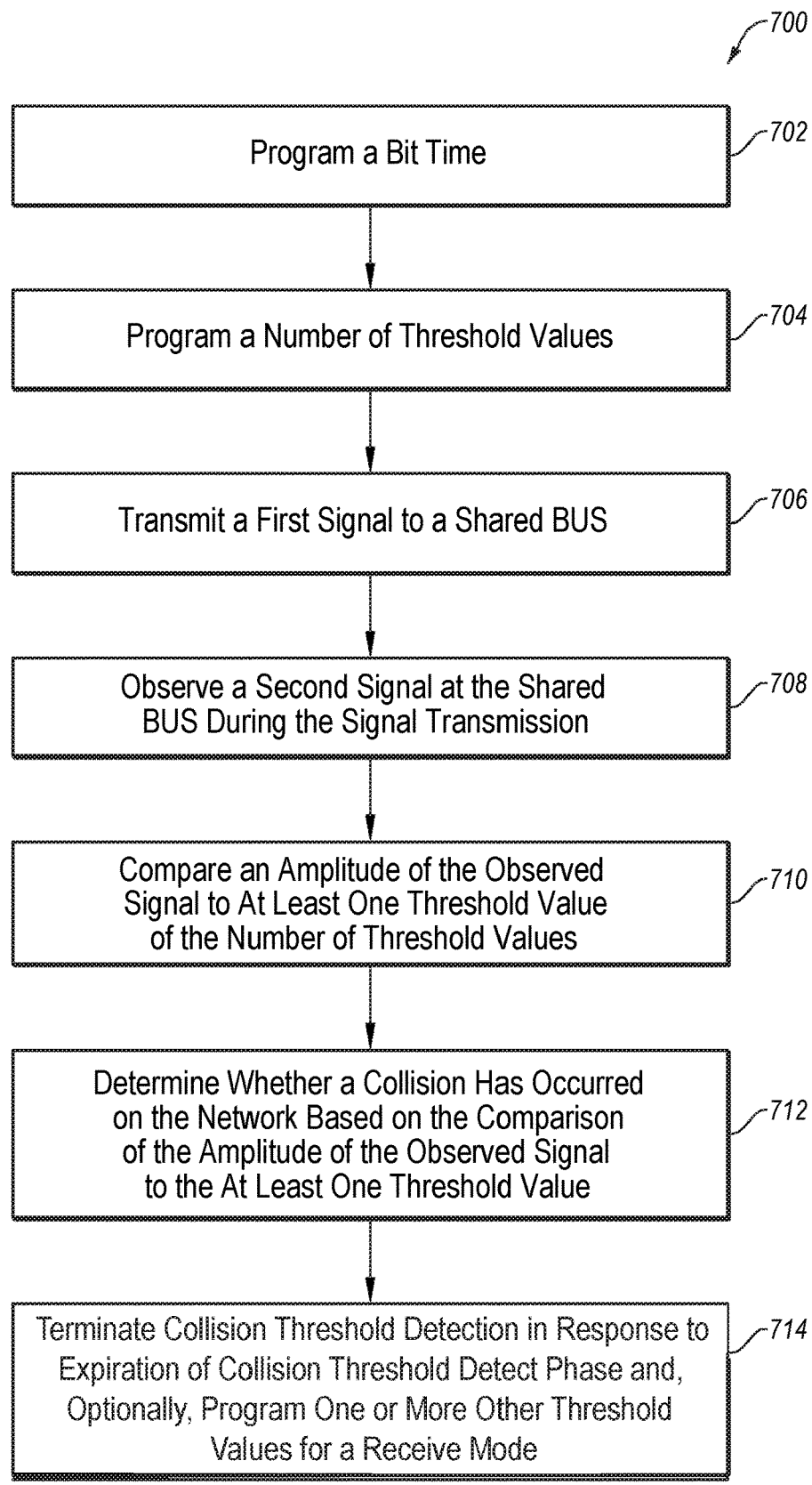
FIG. 7 is a flowchart of an example method of operating a physical layer (PHY) of a network, according to various embodiments of the disclosure.

FIG. 7 is a flowchart of an example method 700 of operating a network, such as a 10SPE network. Method 700 may be arranged in accordance with at least one embodiment described in the present disclosure. Method 700 may be performed, in some embodiments, by a device, system, or network, such as network 100 of FIG. 1, node 102 of FIG. 2, PHY 500 of FIG. 5, and signal detector 600 of FIG. 6, and/or one or more of the components thereof, or another system or device. In these and other embodiments, method 700 may be performed based on the execution of instructions stored on one or more non-transitory computer-readable media. Although illustrated as discrete blocks, various blocks may be divided into additional blocks, combined into fewer blocks, or eliminated, depending on the desired implementation.

Method 700 may begin at block 702, where a bit time for performing collision detection may be programmed, and method may proceed to block 704. More specifically, for example, calibration unit (e.g., calibration unit 510 of FIG. 5) may convey one or more signals to collision logic 508 to program collision logic 508 with the bit time (e.g., 512 bits).

At block 704, a signal detector may be programmed with one or more the threshold values. More specifically, calibration unit (e.g., calibration unit 510 of FIG. 5) may convey a threshold control signal to signal detector (e.g., signal detector 506 of FIG. 5) for programming the signal detector with a threshold value. For example, during a collision detection operation, the signal detector (e.g., signal detector 506) may be programmed with a first threshold value during a first phase (e.g., a first number of bits (e.g., 256 bits)) of the collision threshold detection operation, and the signal detector may be programmed with a different threshold value during a second phase (e.g., a second number of bits (e.g., 256 bits)) of the collision detection operation. Alternatively, multiple instances of signal detector 506 may be provided, each provided with a respective threshold value.

At block 706, a first signal is transmitted to a shared bus, and method 700 may proceed to block 708. For example, a PHY of node 102_2 (see FIG. 1) of a 10SPE network may transmit a signal to bus 104 (see FIG. 1).

At block 708, a second signal at the shared bus may be observed, and method 700 may proceed to block 710. More specifically, for example, the PHY of node 102_2 (see FIG. 1) may observe the second signal (e.g., input signal INPUT of FIG. 5) while transmitting the first signal. In one embodiment, a differential signal may be observed (e.g., at a differential input) and the differential signal may be representative of the second signal.

At block 710, an amplitude of the observed signal may be compared to a number of threshold values, and method 700 may proceed to block 712. For example, the absolute value of the amplitude of the observed signal may be compared to a first set of threshold values (e.g., threshold values 308A and/or 308B of FIG. 3A) and/or second set of threshold values (e.g., threshold values 358A and/or 358B of FIG. 3B). More specifically, for example, during a first phase (e.g., a first number of bits), the amplitude of the observed signal may be compared (e.g., via signal detector 506 of FIG. 5) to the first set of threshold values (e.g., threshold values 308A and/or 308B of FIG. 3A) to determine if the absolute value of the amplitude of the observed signal is greater than the first set of threshold values (i.e., greater than expected). Further, for example, during a second phase (e.g., a second number of bits), the amplitude of the observed signal may be compared (e.g., via signal detector 506 of FIG. 5) to the second set of threshold values (e.g., thresholds 358A and/or 358B of FIG. 3B) to determine if the absolute value of the amplitude of the observed signal is less than the second set of threshold values (i.e., less than expected).

At block 712, based on the comparison of the amplitude of the observed signal to the number of threshold values, it may be determined whether or not a collision has occurred, and method 700 may proceed to block 714. In some embodiments, collision logic (e.g., collision logic 508 of FIG. 5) may determine, based on a detection signal (e.g., signal det_out from signal detector 506 of FIG. 5), whether or not a collision has occurred. More specifically, for example, in response to the absolute value of the amplitude of the observed signal being greater than the first differential threshold value (e.g., thresholds 308A and/or 308B of FIG. 3A) or less than the second differential threshold value (e.g., thresholds 358A and/or 358B of FIG. 3B), it may be determined that a collision has occurred.

At block 714, a collision detection process (e.g., after expiration of the programmable bit time (e.g., 512 bits)) may be terminated. More specifically, for example, in response to a bit count (e.g., determined via transmit circuitry 502) that matches a programmed bit time (e.g., at collision logic 508), the collision detection process may be terminated. Optionally, at block 714 signal detect may be set for a receive mode, and more specifically, set to use other signal threshold values associated with, for example, a period of time for other signal threshold detect 412 of FIG. 4.

Modifications, additions, or omissions may be made to method 700 without departing from the scope of the present disclosure. For example, the operations of method 700 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Further, according to some embodiments, method 700 may include oversampling the signal generated by a signal detector (e.g., to enhance reliability and/or accuracy). More specifically, for example, for a bit unit integral of X nanoseconds, the received signal may be sampled N times. In other words, N samples of the received signal may be processed per bit time (e.g., per 80 nanoseconds). More specifically, as one example, a sample of the received signal may be processed every 10 nanoseconds.

Various embodiments, as disclosed herein, may be related to a low power, quick, and efficient collision detection method, as associated circuitry, which may only require a small area. Various embodiments of the present disclosure may be implemented is 10SPE networks for various applications, such as automotive application, industrial applications, server backplanes, without limitation. Further, various embodiments of the disclosure may be applicable to building, elevators, lighting, industrial in-field, Internet of Things (IOT), without limitation.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc.," is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure include:

Embodiment 1: A method of operating a physical layer (PHY) of a 10SPE network, comprising: transmitting a first signal from a node to a shared bus; observing a second signal that is at the shared bus during at least a portion of the transmitting; and detecting a collision on the shared bus in response to detecting that the observed second signal being one of greater than a first threshold value and less than a second threshold value.

Embodiment 2: The method according to Embodiment 1, further comprising comparing an amplitude of the observed second signal to at least one of the first threshold value and the second threshold value.

Embodiment 3: The method according to any of Embodiments 1 and 2, wherein comparing the amplitude of the observed second signal to at least one of the first threshold value and the second threshold value comprises comparing the amplitude of the observed second signal to both of the first threshold value and the second threshold value.

Embodiment 4: The method according to any of Embodiments 1 through 3, wherein comparing the amplitude of the second signal to at least one of the first threshold and the second threshold comprises comparing an amplitude of a differential signal to at least one of the first threshold value and the second threshold value.

Embodiment 5: The method according to any of Embodiments 1 through 4, wherein detecting the collision comprises detecting the collision during a programmable bit time.

Embodiment 6: A method of operating a single pair Ethernet physical layer (PHY), comprising: transmitting a first signal to a shared bus; and performing collision threshold detection while transmitting the first signal and in response to the first signal being transmitted, the performing collision threshold detection including: observing an amplitude of a second signal at the shared bus; and determining a collision has occurred in response to an absolute value of the observed amplitude of the second signal being one of greater than a first threshold value and less than a second threshold value.

Embodiment 7: The method according to Embodiment 6, wherein observing the amplitude of the second signal comprises observing the amplitude of a differential signal.

Embodiment 8: The method according to any of Embodiments 6 and 7, wherein performing collision threshold detection further comprises: programming a signal detector of the PHY to the first threshold value; comparing, via the signal detector, the absolute value of the amplitude of the second signal to the first threshold value; programming the signal detector of the PHY to the second threshold value; and comparing, via the signal detector, the absolute value of the amplitude of the second signal to the second threshold value, wherein determining the collision has occurred comprises determining the collision has occurred in response to the absolute value of the amplitude of the second signal being one of greater than the first threshold value and less than the second threshold value.

Embodiment 9: A physical layer (PHY) device, comprising: a transmitter configured to transmit a first signal via a shared bus; a signal detector configured to: configured to observe a second signal at a shared bus during transmission of the first signal; compare an amplitude of the observed second signal to a number of threshold values; and generate a detector output signal based on a comparison of the amplitude of the observed second signal to at least one threshold value of the number of threshold values; and collision logic coupled to the signal detector and configured to: receive the detector output signal; and determine whether a collision has occurred on the shared bus based on the detector output signal.

Embodiment 10: The device according to Embodiment 9, wherein the signal detector is configured to receive a control signal for programming the at least one threshold value.

Embodiment 11: The device according to any of Embodiments 9 and 10, further comprising a calibration unit configured to convey one or more controls signals to the signal detector for setting the at least one threshold value.

Embodiment 12: The device according to any of Embodiments 9 through 11, wherein the signal detector includes: a first comparator configured to receive a differential signal including the second signal and generate a first detection signal; a second comparator configured to receive the differential signal including the second signal and generate a second detection signal; and an OR gate configured to receive the first detection signal and the second detection signal and generate the detector output signal.

Embodiment 13: The device according to any of Embodiments 9 through 12, wherein the signal detector is further configured to detect incoming signals in a receive mode.

Embodiment 14: The device according to any of Embodiments 9 through 13, wherein the collision logic is configured to sample the detector output signal at a rate of approximately one sample per 10 nanoseconds.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A method of operating a physical layer (PHY) of a 10 megabits per second (Mbps) Single Pair Ethernet (10SPE) network, comprising:
   transmitting a first signal from a node to a shared bus;
   observing, before an end of a programmed bit time, a second signal that is at the shared bus, the second signal different than the first signal;
   comparing the observed second signal to a first threshold value and to a second threshold value, the second threshold value lower than the first threshold value; and
   detecting a collision on the shared bus in response to the observed second signal being greater than the first threshold value or less than the second threshold value, wherein the end of programmed bit time occurs before an end of bit time for transmitting the first signal.

2. The method of claim 1, wherein comparing the observed second signal to the first threshold value and the second threshold value comprises comparing an amplitude of a differential signal to the first threshold value and to the second threshold value.

3. The method of claim 1, comprising:
generating a signal indicating collision detection responsive to a number of transmitted bits of the first signal being less than the programmed bit time.

4. The method of claim 1, comprising:
generating a signal indicating no collision detection responsive to a number of transmitted bits of the first signal being greater than the programmed bit time.

5. The method of claim 1, comprising:
terminating detecting the collision at least partially responsive to a number of transmitted bits of the first signal being greater than the programmed bit time.

6. A method of operating a single pair Ethernet physical layer (PHY), comprising:
transmitting a first signal to a shared bus; and
initiating a collision threshold detection process responsive to the transmitting the first signal, the collision threshold detection process including:
observing, before an end of programmed bit time, an amplitude of a second signal at the shared bus, the second signal different than the first signal;
comparing the observed amplitude of the second signal to a first threshold value and to a second threshold value, the second threshold value lower than the first threshold value; and
determining a collision occurred responsive to the observed amplitude of the second signal being greater than the first threshold value or being less than the second threshold value,
wherein the end of programmed bit time occurs before an end of bit time for transmitting the first signal.

7. The method of claim 6, wherein observing the amplitude of the second signal comprises observing the amplitude of a differential signal.

8. The method of claim 6, wherein performing collision threshold detection comprises:
programming a signal detector of the PHY to the first threshold value;
comparing, via the signal detector and during a first portion of the programmed bit time, the observed amplitude of the second signal to the first threshold value;
programming the signal detector of the PHY to the second threshold value; and
comparing, via the signal detector and during a second portion of the programmed bit time, the observed amplitude of the second signal to the second threshold value,
wherein determining the collision has occurred comprises determining the collision has occurred in response to the observed amplitude of the second signal being either greater than the first threshold value or less than the second threshold value.

9. The method of claim 6, comprising:
utilizing an output of the collision threshold detection process responsive to an end of the collision threshold detection process occurring before the end of programmed bit time.

10. The method of claim 6, comprising:
ignoring an output of the collision threshold detection process responsive to a number of transmitted bits of the first signal being greater than the programmed bit time.

11. The method of claim 6,
terminating the collision threshold detection process at least partially responsive to a number of transmitted bits of the first signal being greater than the programmed bit time.

12. A physical layer (PHY) device, comprising:
a transmitter to transmit a first signal via a shared bus;
a signal detector to:
observe a second signal at a shared bus, the second signal different than the first signal;
compare an amplitude of the observed second signal to a first threshold value during a first phase of a programmable bit time and to a second threshold value during a second phase of the programmable bit time, the second phase subsequent to the first phase; and
generate a detector output signal based on a comparison of the amplitude of the observed second signal to the first threshold value and to the second threshold value,
wherein an end of programmed bit time occurs before an end of bit time for transmitting the first signal; and
collision logic coupled to the signal detector and to:
receive the detector output signal; and
determine whether a collision occurred on the shared bus based on the detector output signal.

13. The device of claim 12, wherein the signal detector is to receive a control signal for programming at least one of the first threshold value or the second threshold value.

14. The device of claim 12, comprising a calibration unit to convey one or more controls signals to the signal detector for setting at least one of the first threshold value or the second threshold value.

15. The device of claim 12, wherein the signal detector includes:
a first comparator to receive a differential signal including the second signal and generate a first detection signal;
a second comparator to receive the differential signal including the second signal and generate a second detection signal; and
an OR gate to receive the first detection signal and the second detection signal and generate the detector output signal.

16. The device of claim 12, wherein the signal detector is to detect incoming signals in a receive mode.

17. The device of claim 12, wherein the collision logic is to sample the detector output signal at a rate of substantially one sample per 10 nanoseconds.

18. The device of claim 12, wherein the collision logic to determine whether a collision occurred on the shared bus based on the detector output signal and based on whether a number of transmitted bits of the first signal is greater than the programmed value of the programmable bit time.

* * * * *